United States Patent [19]
Kulkarni et al.

[11] Patent Number: 6,033,038
[45] Date of Patent: Mar. 7, 2000

[54] BRAKE CONTROL METHOD HAVING BOOSTER RUNOUT AND PEDAL FORCE ESTIMATION

[75] Inventors: Prakash Krishnamurthi Kulkarni, Novi; Yusaf Amin Khan, Ann Arbor; Hong-xing Wei, Westland, all of Mich.

[73] Assignee: General Motors Corporation, Detroit, Mich.

[21] Appl. No.: 09/102,113

[22] Filed: Jun. 22, 1998

[51] Int. Cl.$^7$ ...................................................... B60T 8/44
[52] U.S. Cl. .................................. 303/114.3; 303/115.2; 303/113.3
[58] Field of Search ............................ 303/115.2, 115.3, 303/114.3 OR, 113.3 MR, 114.1, 115.4, 12, 155, 113.4; 60/553, 554, 547.1, 548

[56] References Cited

U.S. PATENT DOCUMENTS

| | | | |
|---|---|---|---|
| 5,091,857 | 2/1992 | Katayama et al. | 303/139 |
| 5,846,164 | 12/1998 | Harada | 303/114.3 |
| 5,938,297 | 8/1999 | Whaite et al. | 303/115.2 |

OTHER PUBLICATIONS

U.S. application No. 08/764,947, filed Dec. 13, 1996, Whaite et al.
Automotive Engineering, Jun. 1997, pp. 53–54.
Car and Driver, Dec. 1997, pp. 177, 180, 181, 185.
Modeling, Experimentation, Kahn, Y. et al, pp. 111–122.

*Primary Examiner*—Matthew C. Graham
*Assistant Examiner*—Thomas J. Williams
*Attorney, Agent, or Firm*—Robert M. Sigler

[57] ABSTRACT

An electrically augmented brake control method in which vacuum booster run-out and pedal force are accurately predicted as a function of master cylinder pressure and engine vacuum, thereby eliminating the expense of dedicated sensors for measuring the same. A mathematical model of the vacuum booster is used to estimate the apply chamber pressure and the operator brake pedal force, based on measured values of engine vacuum (or manifold absolute pressure) and master cylinder pressure. The point of vacuum booster runout can be detected as the point at which the estimated apply chamber pressure reaches atmospheric pressure. In a preferred embodiment, a force-balance approach is used to carry out the estimation in an accurate but simple manner that is especially amenable to real-time control in an automotive on-board micro-controller.

10 Claims, 5 Drawing Sheets

6,033,038

BRAKE CONTROL METHOD HAVING BOOSTER RUNOUT AND PEDAL FORCE ESTIMATION

This invention relates to electrically assisted vacuum boost braking systems, and more particularly to a control method for accurately detecting pedal force and a condition of vacuum booster run-out.

BACKGROUND OF THE INVENTION

In automotive braking systems, a master cylinder converts driver exerted brake pedal force into a corresponding hydraulic pressure, which is proportioned among the front and rear brakes. In so-called power assisted braking systems, a vacuum booster is interposed between the pedal and the master cylinder to amplify the force applied to the master cylinder. The vacuum booster has access to engine vacuum, and amplifies the driver exerted force by controlling the pressure differential across one or more diaphragms coupled to the master cylinder. In a typical system, a vacuum chamber disposed on the master cylinder side of the diaphragm is coupled to engine vacuum, and an apply chamber disposed on the brake pedal side of the diaphragm is coupled to a valve that varies the pressure in the chamber between engine vacuum and atmospheric pressure. In these systems, the booster is said to reach a "run-out" condition when the apply chamber is at atmospheric pressure, since there can be no further amplification of the brake pedal force.

In more sophisticated braking systems, the force amplification of the vacuum booster is modified and/or supplemented by an electrically controlled pressure modulator. Control of the modulator requires knowledge of the pedal force and the operating state of the vacuum booster, particularly whether the booster is operating in a run-out condition. The conventional approach in this regard is to use dedicated sensors for measuring the necessary parameters. For example, a force sensor can be used to measure the pedal force, and a pressure sensor can be used to measure the apply chamber pressure, with an impending run-out condition being detected when the measured apply chamber pressure reaches atmospheric pressure. This approach, of course, entails the cost penalty of additional sensors, increasing the overall system cost.

SUMMARY OF THE PRESENT INVENTION

The present invention is directed to an improved electrically assisted brake control method in which vacuum booster run-out and pedal force are accurately predicted as a function of master cylinder pressure and engine vacuum, thereby eliminating the expense of additional dedicated sensors. According to this invention, a mathematical model of the vacuum booster is used to estimate at least the apply chamber pressure, and preferably, the operator brake pedal force, based on measured values of engine vacuum (or manifold absolute pressure) and master cylinder pressure. The point of vacuum booster runout can be detected as the point at which the estimated apply chamber pressure reaches atmospheric pressure. In a preferred embodiment of this invention, a force-balance approach is used to carry out the estimation in an accurate but simple manner that is especially amenable to real-time control in an automotive on-board micro-controller. With the control method of this invention, the various pedal force and booster pressure sensors required in prior systems are eliminated, contributing to a cost effective brake control system.

DETAILED DESCRIPTION OF THE DRAWINGS

Figure 1:
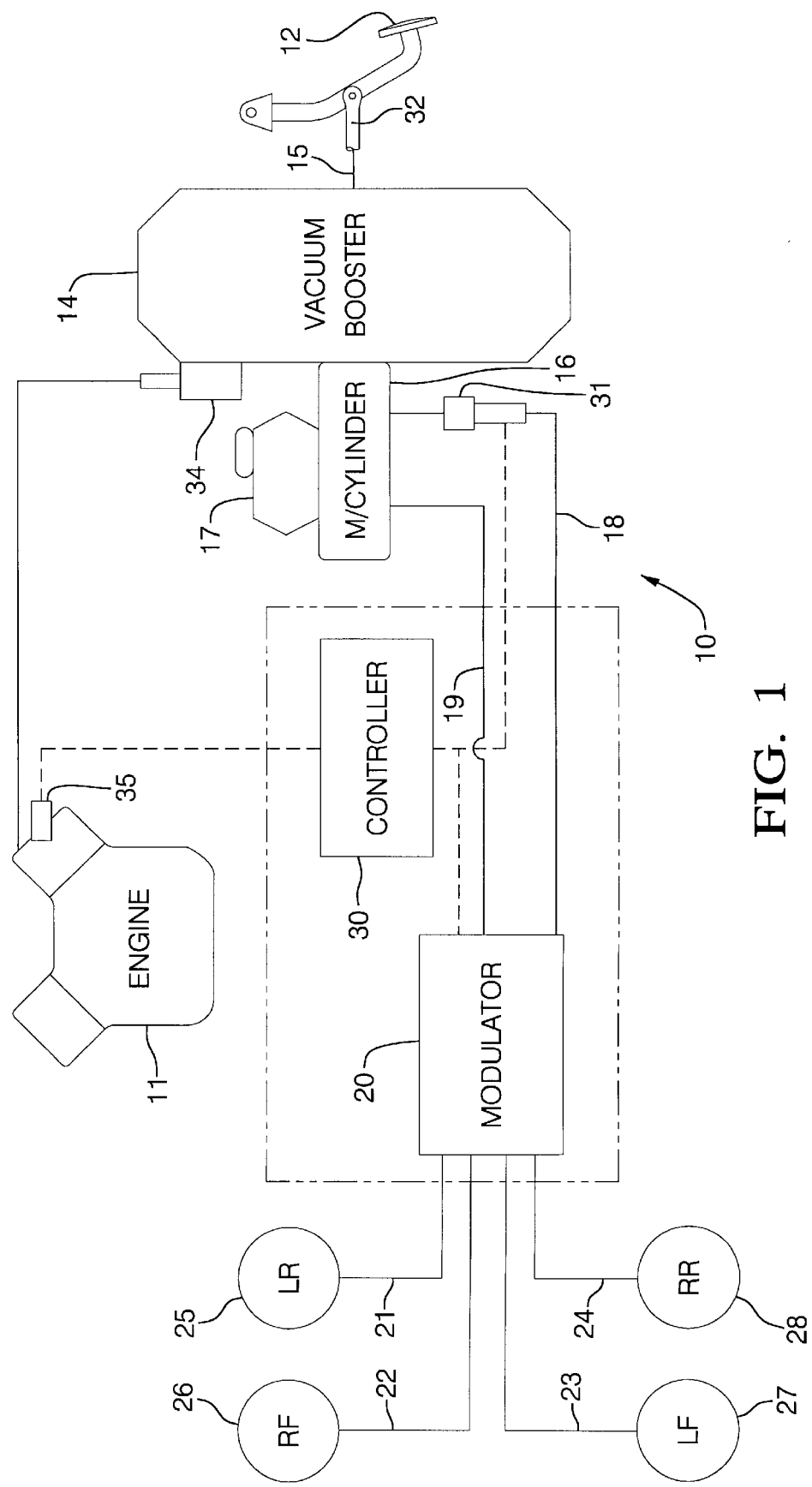
FIG. 1 is a diagram of an electrically assisted brake control system according to this invention.

Referring to the drawings, FIG. 1 illustrates a brake system 10 in which an electrically operated modulator 20 supplies supplemental hydraulic braking pressure upon detection of vacuum booster runout. Although a diagonally split braking system is illustrated as an exemplary embodiment, the present invention is readily applicable to other types of brake systems such as a front/rear split system or a four channel system. The brake system 10 includes a brake pedal 12 which provides a force input to the vacuum booster 14 through the push-rod 15. The force applied to the push-rod 15 by the pedal 12 is amplified by the vacuum booster 14 and is communicated to the master cylinder 16. The master cylinder 16 includes a fluid reservoir 17 for supplying the fluid needs of the brake system 10. The master cylinder 16 is of the conventional dual piston type wherein movement of the master cylinder pistons develops hydraulic pressure which is transmitted to a split braking system through brake lines 18 and 19. Brake lines 18 and 19 extend through a modulator 20 and branch into brake lines 21–24 which connect with the four wheel brakes 25–28. Modulator 20 is an electro-hydraulic device such as a motor operated piston for controllably modifying the master cylinder brake pressures distributed to the brake lines 21–24.

An electronic controller 30 is provided for managing operation of the brake system 10. The controller 30 communicates with the modulator 20 and also with the engine manifold air pressure sensor 35 and the pressure sensor 31 which measures the fluid pressure in brake line 18 as generated by the master cylinder 16. Element 34 is a vacuum check valve which permits a one-way flow of air from the booster 14 to the manifold of engine 11. The controller 30 may also be provided with brake line pressure signals for the pressure at wheel brakes 25–28 through a conventional means. Through the use of a mathematical model of the vacuum booster 14, the controller 30 is capable of estimating the force applied to brake pedal 12 and detecting the point of vacuum booster runout. The detection of runout is used to activate the modulator 20 to supply supplemental brake pressure, and the estimated pedal force is used to control the modulator 20 so that the braking force varies linearly with pedal force in spite of the runout condition.

Figure 2:
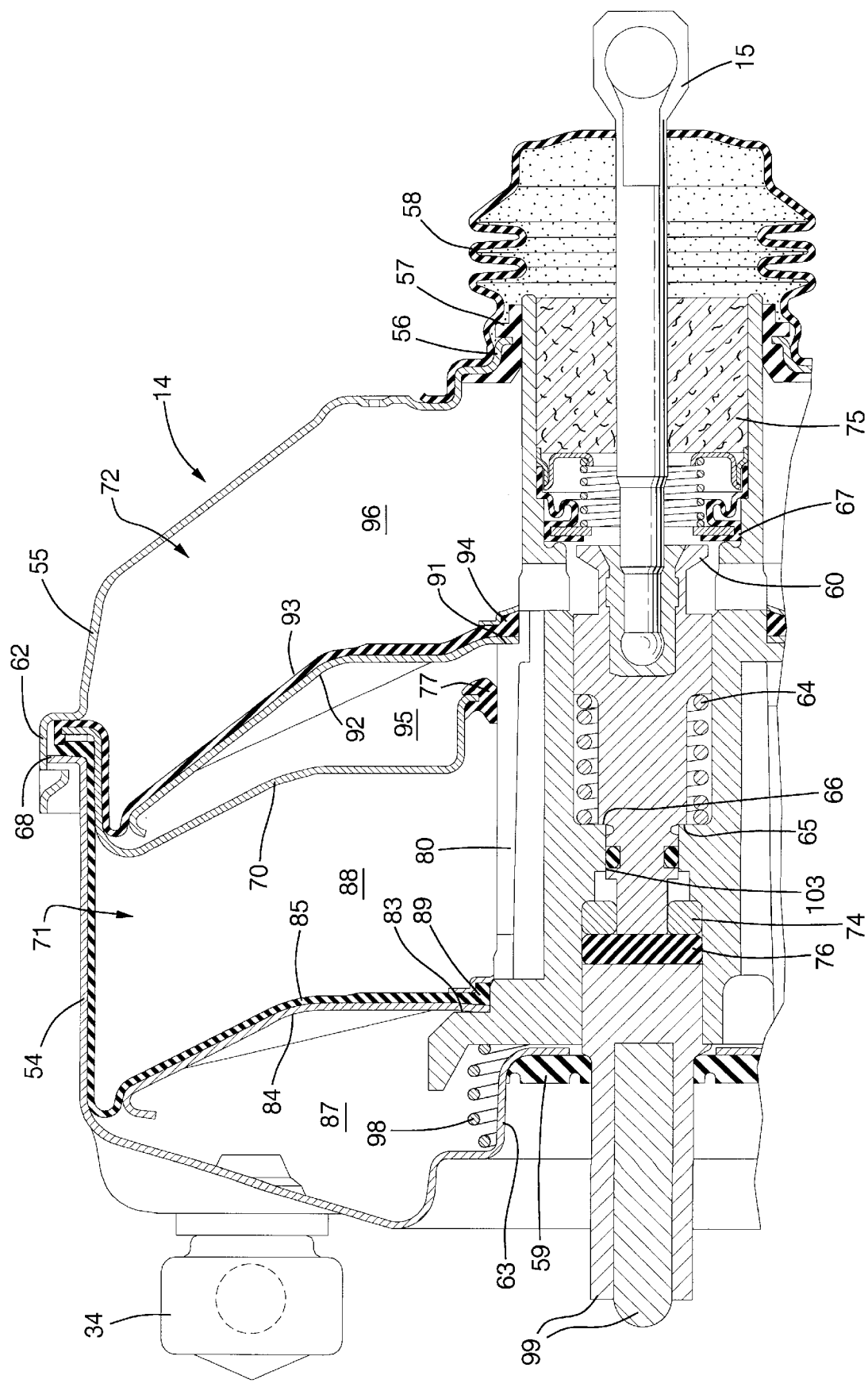
FIG. 2 is a diagram of a conventional vacuum booster, as shown in FIG. 1.

FIG. 2 depicts the vacuum booster 14 of FIG. 1 in greater detail. Although vacuum booster 14 is a dual diaphragm vacuum operated booster in this exemplary embodiment, the present invention is also applicable to systems with a single diaphragm vacuum booster. FIG. 2 illustrates in cross section essentially half the vacuum booster 14 with the remaining unillustrated portion being substantially a mirror image for purposes of the present discussion. Vacuum booster 14 has a substantially open internal cavity which is formed by mating front housing 54 and rear housing 55. The front and rear housings 54 and 55 are formed from a conventional material such as metal or plastic. Rear housing 55 includes an axially extending flange 62 that mates with outer turned flange 68 of front housing 54 locking the housings 54, 55 together. An inner edge 56 of rear housing 55 carries a seal 57. The end of rear housing 55 is enclosed by boot 58 which is received over the inner edge 56. Another seal 59 seals the area at inner edge 63 of front housing 54. The seal 59 is secured between the rearward end of master cylinder 16, (seen in FIG. 1), and the front housing 54.

A housing divider 70 separates the internal cavity into front and rear chambers 71 and 72, respectively. Housing divider 70 includes an outer peripheral flange which is engaged between the front housing 54 and rear housing 55. Housing divider 70 also includes an inner edge which carries an annular seal 77. A power piston 80 extends through annular seals 57 and 77, and is slidable forwardly and rearwardly within the annular seals 57 and 77. The annual seals 57 and 77 act as bearings for supporting the power piston 80 in the lateral direction.

Power piston 80 includes a rearwardly directed wall 83 against which support plate 84 supports diaphragm 85. Diaphragm 85 includes an integral inner annular seal 89 which engages the power piston 80. Diaphragm 85 separates chamber 71 into vacuum chamber 87 and apply chamber 88. Power piston 80 also includes rearwardly directed wall 91 against which support plate 92 supports diaphragm 93. Diaphragm 93 includes an integral inner annular seal 94 which engages the power piston 80. Diaphragm 93 separates rear chamber 72 into vacuum chamber 95 and apply chamber 96.

The diaphragms 85 and 93, and their respective support plates 84 and 92, are operable such that a vacuum pressure exists in vacuum chambers 87 and 95 which is generated therein through vacuum check valve 34 by the engine 11. A variable pressure exists in apply chambers 88 and 96 for selectively moving power piston 80 forward in response to pressure differentials created by the introduction of atmospheric air through air valve 60. The variable pressure in apply chambers 88 and 96 selectively creates a force on the respective diaphragms 85 and 93. The support plates 84 and 92 apply the force of the diaphragms 85 and 93 to the respective rearwardly directed walls 83 and 91 of power piston 80. In response, power piston 80 compresses return spring 98 as shown, causing power piston 80 to slide within annular seals 77 and 78 forcing rod 99 to apply force to the master cylinder 16.

The variable pressure in apply chambers 88 and 96 is increased through operation of the air valve 60. Air valve 60 is illustrated in the open position which allows atmospheric pressure to enter the apply chambers 88 and 96 and thus creates a pressure differential across the diaphragms 85 and 93. The maximum pressure differential between vacuum chambers 87 and 95 on one hand and apply chambers 88 and 96 on the other hand, is the difference between engine vacuum and atmospheric pressure.

Atmospheric air entering the vacuum booster 14 travels through filter 75 and the vacuum drawn from the vacuum booster 14 exits through vacuum check valve 34 which is received in the front housing 54. Power piston 80 includes a plurality of air passages through which flow is directed in a conventional manner. The vacuum booster 14 is shown in a run-out condition meaning that the air valve 60 is fully opened compressing spring 64 with shoulder 65 against stop 66. The power piston 80 is moved to the left as viewed in FIG. 2 to the run-out position such that spring 98 is compressed and no additional power boost is possible.

When the pressure in apply chambers 88 and 96 reaches atmospheric no further additional pressure differential increase is possible. Accordingly, the vacuum booster 14 is no longer able to further amplify the driver force input on the pedal 12. Additional force on the pedal 12 still translates into increased pressure at the wheel brakes 25–28, however, the additional pressure is solely a function of the input force on the pedal 12 rather than being a function of the boost ratio of the vacuum booster 14. The power piston 80 transmits power assisted force through the elements 74 and 76 to the rod 99 and therethrough to the master cylinder 16. At the run-out condition further travel of the power piston 80 is possible. Therefore, the presence of increased force applied through the brake pedal 12 to the push-rod 15 results in application of an additional force, referred to herein as contact force (Fcontact), through the elements 74 and 76, and therethrough to the rod 99.

After brake application, when the push-rod 15 is released, spring 64 forces air valve 60 to close with floating control valve 67 interrupting the flow of atmospheric air into the vacuum booster 14. Vacuum flow out through the vacuum check valve 34 re-equalizes pressure on opposing sides of diaphragms 85 and 93. As the pressure differential is reduced, return spring 98 forces power piston 80 to slide rearwardly and return to an at-rest position.

Referring to FIGS. 1 and 2 in combination, when the vacuum booster 14 is in the run-out condition, the modulator 20 operates to assist or control braking application. When in the run-out condition, the vacuum booster 14 is no longer able to further amplify the driver force input on the pedal 12. At this point the brake system 10 uses the modulator 20 to augment the brake pressure applied to the wheel brakes 25–28. Through use of the modulator 20, braking pressure is increased and a linear relationship is maintained between the application of force to the brake pedal 12 and braking pressure beyond the run-out point of the vacuum booster 14.

Figure 3:
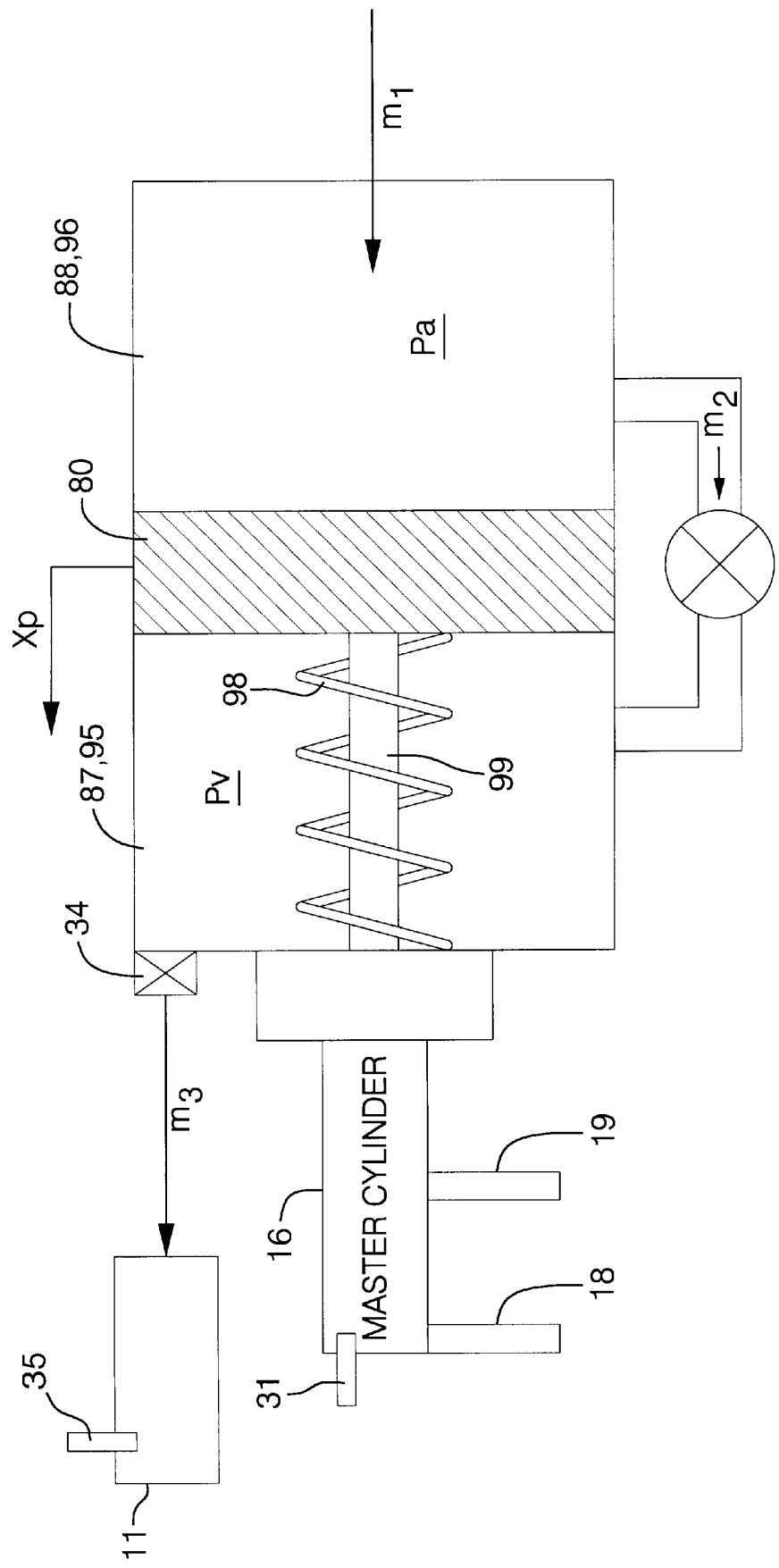
FIG. 3 is a diagram of a model of the vacuum booster of FIG. 2.

According to this invention, a model of the vacuum booster 10 is used to accurately estimate pedal force and booster run-out based on sensed master cylinder pressure and engine manifold absolute pressure (MAP). No extra sensors are required since these signals are customarily provided for control or diagnostic purposes in engine control systems and/or electrically assisted braking systems. A schematic depiction of the model is given in FIG. 3. Depicted in the model are an apply chamber (corresponding to the chambers 88,96), a vacuum chamber (corresponding to the chambers 87, 95), an inter-chamber valve (corresponding to internal power piston passages, as affected by air control valve 60), power piston 80, output rod 99, return spring 98, check-valve 34, and engine intake manifold, and master cylinder MC. Air flows are shown from atmosphere into the apply chamber (m1), from the apply chamber into the vacuum chamber (m2), and from the vacuum chamber into the intake manifold (m3). The apply and vacuum chamber pressures are designated as pa and pv, respectively, and Xp designates the displacement of the power piston 80.

According to a first embodiment of this invention, the model-based differential equations for the apply and vacuum chamber pressures are solved simultaneously and used to estimate the pedal force. The power piston travel Xp is computed as a function of master cylinder pressure Pmc using an empirically determined calibration table, and the first and second expressions for the differential apply and vacuum chamber pressures are simultaneously solved to detect run-out and to determine pedal force. These values, in turn, are used by controller 30 to provide supplemental braking assist force during runout so as to linearize the relationship between pedal force and braking pressure.

The differential equation for the apply chamber pressure Pa takes into account the mass flow rate m1 of air coming from the atmosphere into the apply chamber, the mass flow rate m2 of air from apply chamber into the vacuum chambers, and the work done on or by the booster diaphragms 85, 93. The rate of change in apply pressure with respect to time, d(Pa)/dt, can be modeled by the expression:

$$d(Pa)/dt = 1/Va \ [R \ \gamma Tatm(m1\psi 1 - m2\psi 2) - \gamma Pa \ Ab \ Xpdot] \quad (1)$$

where Va is the product of the total diaphragm area and the change in displacement of the power piston 80, R is the universal gas constant, y is the Boyle's coefficient for air (1.4), Tatm is the under-hood air temperature, m1 is the mass flow rate of air entering the apply chambers 88 and 96 through the air control valve 60, m2 is the mass flow rate of air exiting the apply chambers 88 and 96 through the air control valve 60, Ab is total booster diaphragm area, and Xpdot is the time rate of change in power piston displacement.

The terms ψ1 and ψ2 designate the mode of operation as follows. If Xpdot>0, signifying leftward movement of the power piston 80 as viewed in FIGS. 2–3, ψ1=1 and ψ2=0. In this instance, the value of the expression (m1 ψ1–m2 ψ2) is equal to m1. If Xpdot<0, signifying rightward movement of the power piston 80, ψ1=0 and ψ2=1, and the value of the expression (m1 ψ1–m2 ψ2) is equal to m2. If Xpdot=0, signifying no movement of the power piston 80, ψ1=ψ2=0, and the value of the expression (m1 ψ1–m2 ψ2) is equal to zero.

Both m1 or m2 can be given by the expression:

$$m1 = m2 = C_d A p u \sqrt{\gamma / RTu} \ [1 - e^{-(B|i-\nu|+\gamma|1-\nu|^2)}] \mathrm{Sign}(\psi_1 - \psi_2)$$

where Cd is a discharge coefficient, A is the area of the internal air passages of power piston 80, pu is the air pressure upstream of the air passage, pd is the air pressure downstream of the air passage, v is the ratio of pd to pu, and B is the value of singularity when the ratio v is equal to one. For m1, pu and pd designate atmospheric pressure Patm and the apply chamber pressure pa, respectively. For m2, and pu and pd designate the apply chamber pressure Pa and vacuum chamber pressure Pv, respectively.

The differential equation for the vacuum chamber pressure Pv takes into account the mass flow rate m3 of air coming from the vacuum chamber into the engine through the check valve 38, the mass flow rate m2 of air from the apply chamber into the vacuum chamber, and the work done on or by the booster diaphragms 85 and 93. The rate of change in vacuum chamber pressure with respect to time, d(Pv)/dt, can be modeled by the expression:

$$d(Pv)/dt = 1/Vv \ [R \ \gamma Tatm \ (m2\psi 2 - m3\psi 3) - \gamma pv \ Ab \ Xpdot] \quad (3)$$

where Vv is given by the expression:

$$Vv = Aboost[(Xpmax/2) - Xp(0) - Xp)]. \quad (4)$$

In the above expressions, R is the universal gas constant, γ is the Boyle's coefficient for air (1.4), Tatm is the under-hood air temperature, Aboost is total booster diaphragm area, and Xpdot is the time rate of change in power piston displacement Xp. The term Xpmax is the maximum allowable travel of power piston 80, and the term Xp(0) is the initial travel of the power piston. The mass flow rate m3 is determined empirically as a function of the pressure differential between the vacuum chamber and the engine intake manifold.

The terms ψ2 and ψ3 designate the mode of operation as follows. As explained above in respect to expression (1), ψ2 is zero if Xpdot>0, and one if Xpdot<0. The value of ψ3 is one when the vacuum chamber pressure Pv is higher than engine vacuum pressure, and zero otherwise. In term of the measured engine manifold absolute pressure Pmap, ψ3 is one when (Pv–Pmap)>0.

Figure 4:
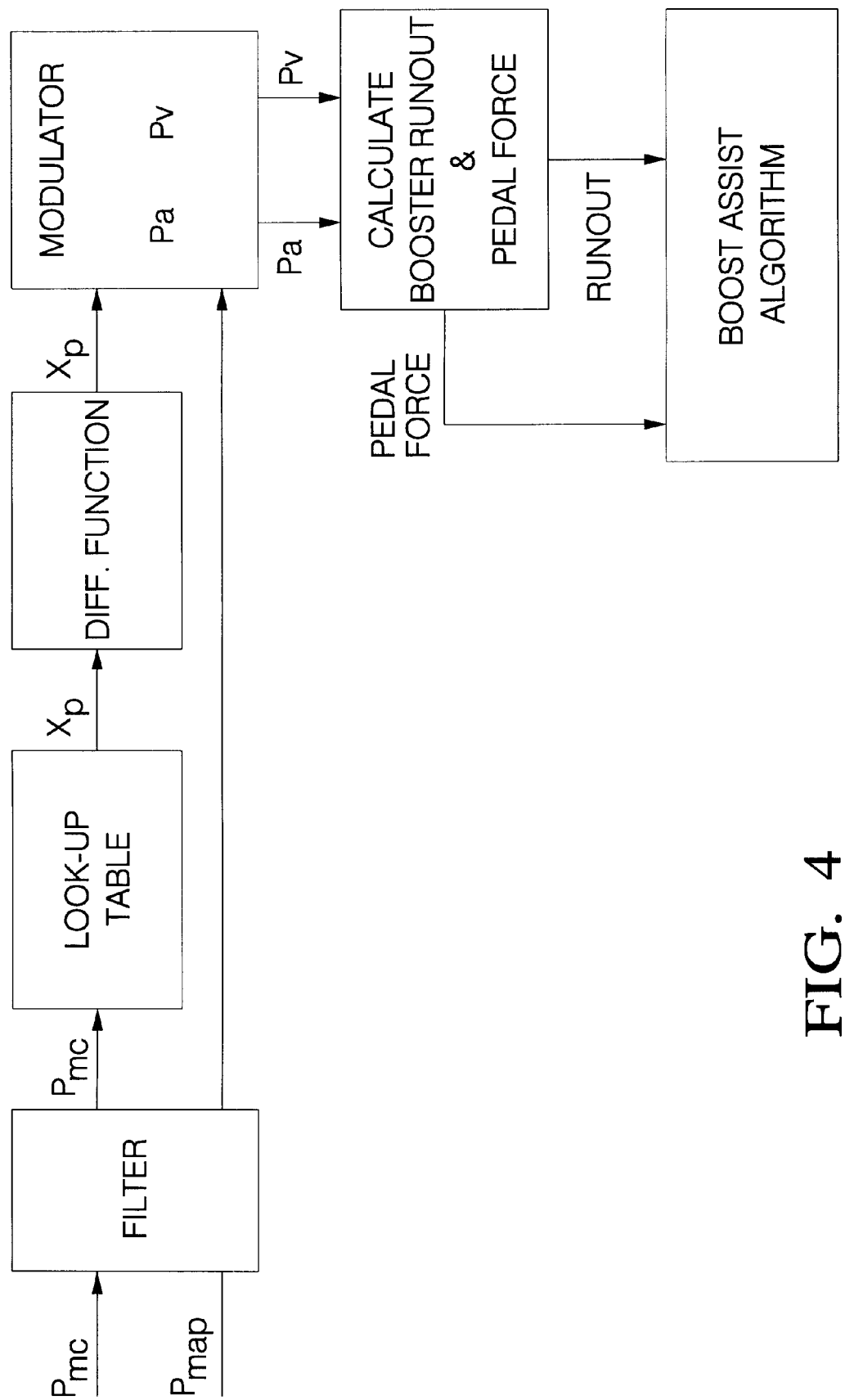
FIG. 4 is a block diagram of a runout detection and pedal force estimation technique according to a first embodiment of this invention.

The expressions (1) and (2) can be solved simultaneously in real time by using a simple Euler's integration. A diagram of a control algorithm based on this approach is shown in FIG. 4, where the master cylinder pressure and engine vacuum pressure (manifold absolute pressure) are supplied as inputs. The master chamber pressure Pmc is filtered and used to determine the power piston position Xp by table look-up, and the position Xp is differentiated and supplied as an input along with the filtered engine vacuum pressure Pmap to a calculation routine for the apply and vacuum chamber pressures Pa and Pv. The apply and vacuum chamber pressures, in turn, are used to compute the pedal force and runout pressure, as described above, and are supplied as inputs to a boost assist algorithm that controls the operation of modulator 20. While theoretically sound, this approach typically requires a very small integration time step to achieve sufficient accuracy, and therefore tends to be computationally burdensome for the typical automotive micro-controller.

Figure 5:
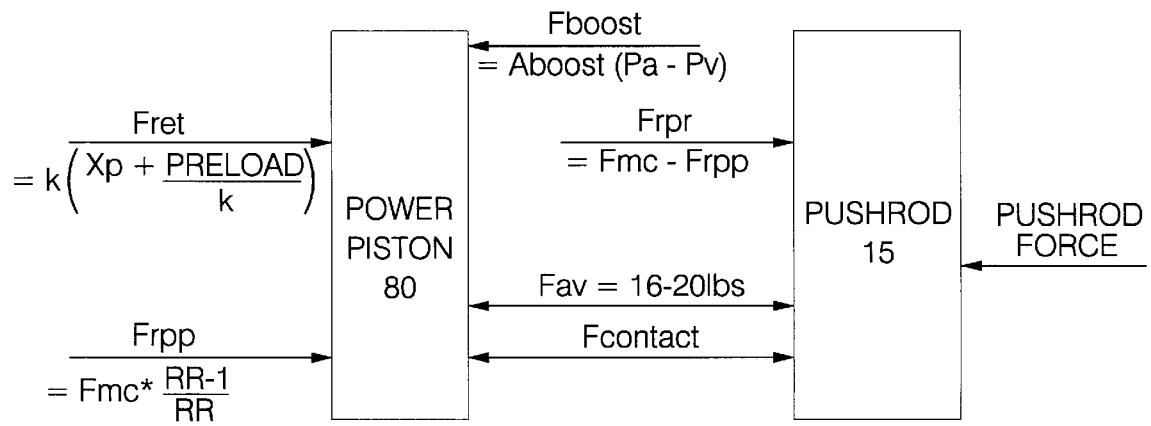
FIG. 5 is a force diagram for detecting runout and estimating pedal force in accordance with a second embodiment of this invention.

According to the second and preferred embodiment of this invention, the apply chamber pressure is calculated based on a simplified static force balance model, depicted generally in FIG. 5. The force balance model illustrates the opposing forces acting on pushrod 15 and power piston 80. The air valve spring 64 produces equal and opposite forces Fav on the pushrod 15 and power piston 80, as does the contact force Fcontact once runout occurs. The pushrod force (that is, the pedal force Fpedal acting through the amplification ratio Rbp of the brake pedal 12) is opposed by the sum of the pushrod reaction force Frpr, the air valve spring force Fav, and the contact force Fcontact. The sum of the boost force Fboost, the air valve spring force Fav, and the contact force Fcontact is opposed by the sum of the power piston reaction force Frpp and the force Fret of return spring 98.

The magnitude of certain forces can be determined from the measured master cylinder pressure Pmc, viewed in the force balance model as a master cylinder input force Fmc. The power piston reaction force Frpp is a function of the master cylinder force Fmc and the reaction ratio RR, or gain, of the booster 14. The pushrod reaction force Frpr, in turn, is determined according to the difference between the master cylinder force Fmc and the power piston reaction force Frpp. The position Xp of the power piston 80, also determined as a function of the master cylinder pressure Pmc, is used to compute the return spring force Fret. The air valve spring force Fav is treated as a constant.

Other forces such as the boost force Fboost, the contact force Fcontact and the pedal force Fpedal require knowledge of the apply and vacuum chamber pressures Pa and Pv. The boost force Fboost is a function of the pressure differential Pa–Pv, and is used to compute the contact force Fcontact. The contact force Fcontact, in turn, is used along with the air valve spring force Fav and the pushrod reaction force Frpr, to compute the pedal force Fpedal. Due to the recursive nature of the solution, these forces are calculated based on the previously computed or last values of Pa and Pv, respectively designated herein as Pa(last) and Pv(last).

In terms of the above-described forces, runout occurs when the apply chamber pressure Pa reaches atmospheric pressure Patm. At such point, the contact force Fcontact is determined according to the amount by which the sum of the power piston reaction force Frpp and the return spring force Fret exceeds the sum of the air valve spring force Fav and the boost force Fboost.

During runout, the apply chamber is open to atmospheric pressure, and is therefore equal to Patm. Prior to runout, the apply chamber pressure Pa is computed in terms of the forces acting on the power piston 80, according to the expression:

$$Pa=Pv(last)+(Frpp+Fret-Fav-Fcontact)/Aboost \qquad (5)$$

The vacuum chamber pressure Pv is then determined by solving expression (3) for d(Pv)/dt, and then integrating the result. The flow m3 through check valve 34 is determined as a function of the pressure differential across the check valve 34. However, if Pv(last) is less than or equal to the measured Pmap, there is no flow, and m3=0. The flow m2 from the apply chamber to the vacuum chamber during the release mode is determined as a function of the pressure ratio Pv(last)/Pa.

Figure 6:
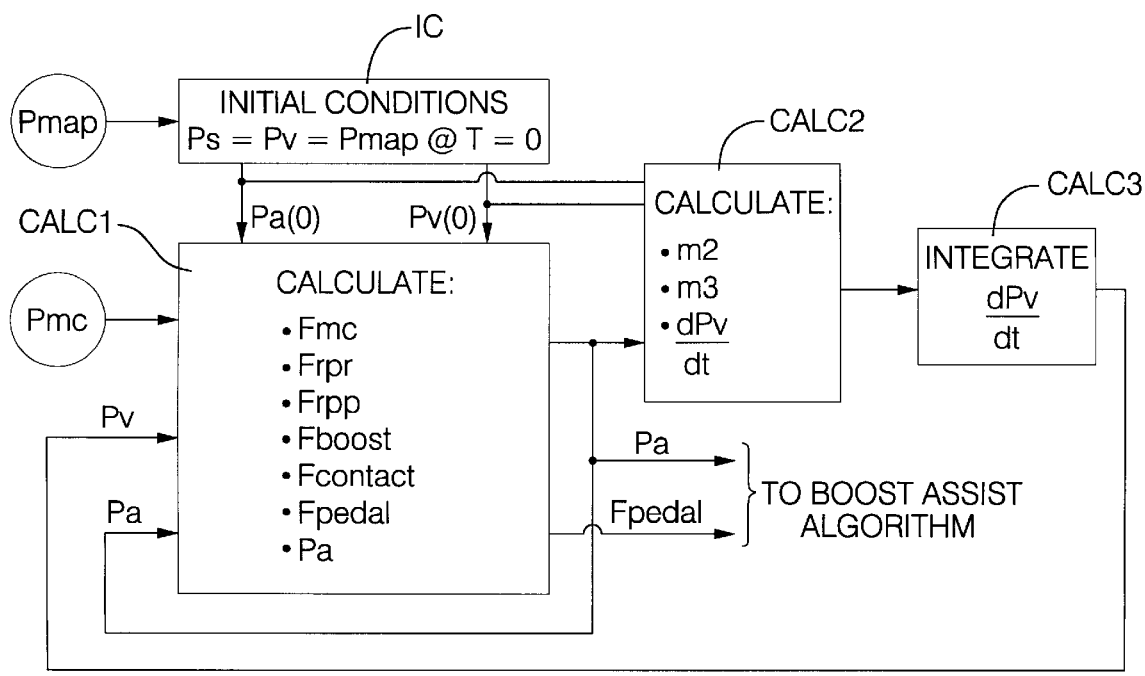
FIG. 6 is a block diagram of a runout detection and pedal force estimation technique according to the second embodiment of this invention.

A block diagram of the above-described approach is depicted in FIG. 6, where Pmap and Pmc are shown as measured inputs, and Pa and Fpedal are shown as outputs to the boost assist algorithm. The Initial Conditions block IC sets the initial values of Pa and Pv, based on the measured value of Pmap, and thereafter, the computed values of Pa and Pv are used to calculate the various force and pressure terms shown in Calculation blocks CALC1 and CALC2. The integration of d(Pv)/dt shown in Calculation block CALC3 is performed numerically by any of a number of conventional techniques.

In summary, the present invention provides an electrically augmented brake control system including a vacuum power booster, wherein the point of vacuum booster runout and the brake pedal force are estimated based on sensed engine vacuum and master cylinder pressure. This eliminates the plural dedicated sensors used in prior electrically augmented brake control systems, significantly reducing the overall system cost. While this invention has been described in reference to the illustrated embodiments, it will be understood that various modifications and substitutional elements will occur to those skilled in the art. For example, it is possible to practice a control method in which the apply chamber pressure Pa is determined to detect runout, and the modulator is controlled based on a parameter other than pedal force. In this regard, it will be understood that the scope of this invention is not limited to the illustrated embodiments, but rather, is defined by the appended claims.

The embodiments of the invention in which an exclusive property or privilege is claimed are defined as follows:

1. A method of operation for a brake system having a brake pedal for developing brake pedal force, a vacuum booster coupled to said brake pedal, and having a vacuum chamber coupled to a source of vacuum and an apply chamber variably coupled to both the vacuum source and atmospheric pressure for amplifying the brake pedal force, a master cylinder coupled to an output member of the vacuum booster for producing brake pressure in response to the amplified brake pedal force, and an electrically activated modulator for augmenting the brake pressure, the method comprising the steps of:

measuring the vacuum pressure of said vacuum source;

measuring the brake pressure produced by said master cylinder;

estimating a current value of pressure in the apply chamber of said vacuum booster based on said measured vacuum pressure and brake pressure, and a previous estimate of the pressures in said vacuum and apply chambers;

comparing said estimated pressure with atmospheric pressure to detect a condition of vacuum booster runout for which said vacuum booster cannot further amplify the brake pedal force; and activating said modulator to augment said brake pressure in response to the detection of said runout condition.

2. The method of operation set forth in claim 1, including the steps of:

estimating a current value of pressure in the vacuum chamber of said vacuum booster based on said measured vacuum pressure and brake pressure, and the previous estimates of the pressures in said vacuum and apply chambers;

estimating the brake pedal force based on the estimated values of said apply and vacuum chamber pressures; and activating said modulator so that the augmented brake pressure varies in relation to the estimated brake pedal force.

3. The method of operation set forth in claim 1, wherein the step of estimating a current value of pressure in the apply chamber includes the step of simultaneously solving a first expression for the differential pressure in the apply chamber and a second expression for the differential pressure in the vacuum chamber.

4. The method of operation set forth in claim 1, wherein the step of estimating a current value of pressure in the apply chamber includes the steps of solving a static expression for the pressure in the apply chamber, and solving an expression for the differential pressure in the vacuum chamber.

5. The method of operation set forth in claim 4, wherein the static expression for the pressure in the apply chamber is based on a balance of opposing forces acting on said output member of said vacuum booster.

6. The method of operation set forth in claim 5, including the step of estimating a contact force operating on said output member due to brake pedal force coupled to said vacuum booster during said runout condition.

7. The method of operation set forth in claim 6, wherein the contact force is estimated as the force required to balance opposing forces acting on said output member of said vacuum booster.

8. The method of operation set forth in claim 4, including the step of estimating the pressure in the apply pressure according to the lesser of atmospheric pressure and the pressure provided by said static expression.

9. The method of operation set forth in claim 2, including the steps of solving a static expression for the pressure in the apply chamber based on a balance of opposing forces acting on said output member, solving an expression for the differential pressure in the vacuum chamber, and estimating the brake pedal force according to the sum of forces opposing said brake pedal force.

10. The method of operation set forth in claim 9, wherein the forces opposing said brake pedal force during the runout condition of said vacuum booster include a contact force required to balance opposing forces acting on said output member.

* * * * *